United States Patent
Lee et al.

[15] 3,650,602
[45] Mar. 21, 1972

[54] PARALLEL ARRAY LIGHT BEAM DEFLECTOR WITH VARIABLE PHASE PLATE

[72] Inventors: Tzuo-Chang Lee, Bloomington; James D. Zook, Burnsville, both of Minn.

[73] Assignee: Honeywell Inc., Minneapolis, Minn.

[22] Filed: Aug. 19, 1970

[21] Appl. No.: 64,980

[52] U.S. Cl. .................................... 350/160 R, 350/161
[51] Int. Cl. ................................. G02f 1/34, G02f 1/28
[58] Field of Search ................................. 350/160, 161

[56] References Cited

UNITED STATES PATENTS 3,497,285  2/1970  Eden ........................................ 350/160

Primary Examiner—Ronald L. Wibert
Assistant Examiner—V. P. McGraw
Attorney—Lamont B. Koontz and Omund R. Dahle

[57] ABSTRACT

The number of resolvable spots produced by a light beam deflection system can be increased by the use of a parallel array of light beam deflectors and a variable phase plate which adjusts the phase of the light entering each of the individual deflectors so that light emerging from the deflectors is coplanar.

12 Claims, 11 Drawing Figures

Patented March 21, 1972

INVENTORS
TZUO-CHANG LEE
JAMES D. ZOOK

BY

Osmund R. Dahle

ATTORNEY.

Patented March 21, 1972
3,650,602
3 Sheets-Sheet 2
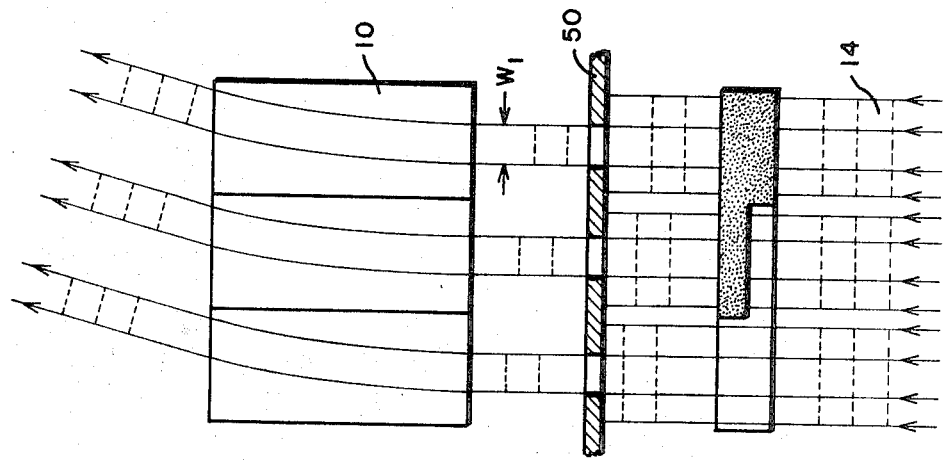
FIG. 5
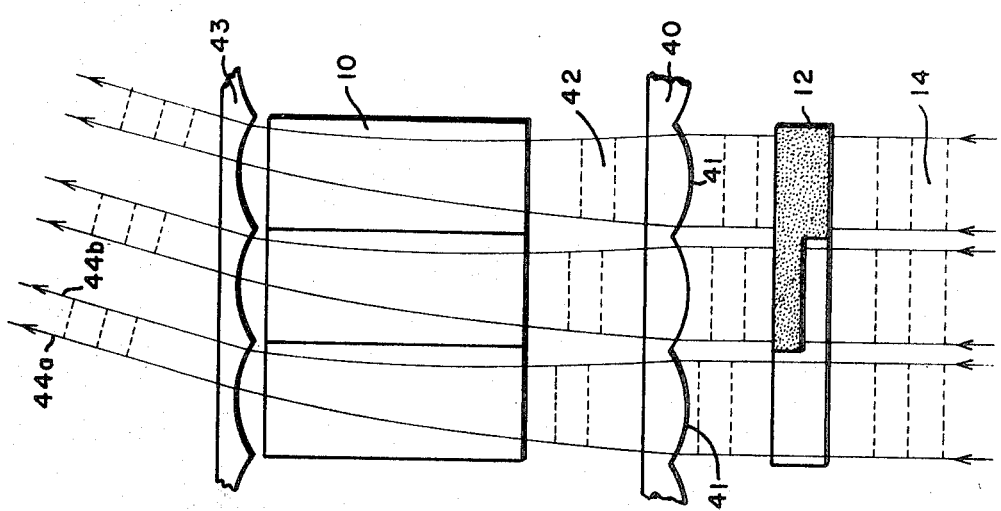
FIG. 4
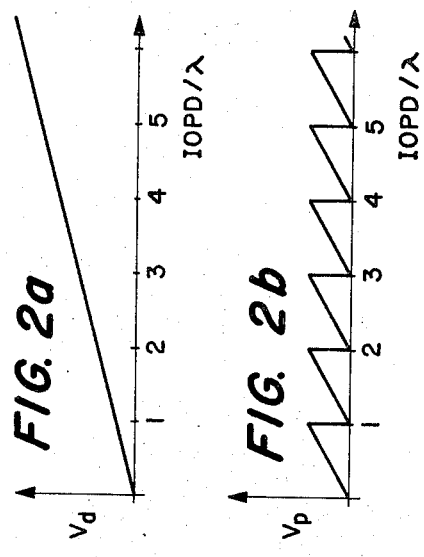
FIG. 2a
FIG. 2b
INVENTORS
TZUO-CHANG LEE
JAMES D. ZOOK
BY  *Omund R. Dahle*
ATTORNEY.

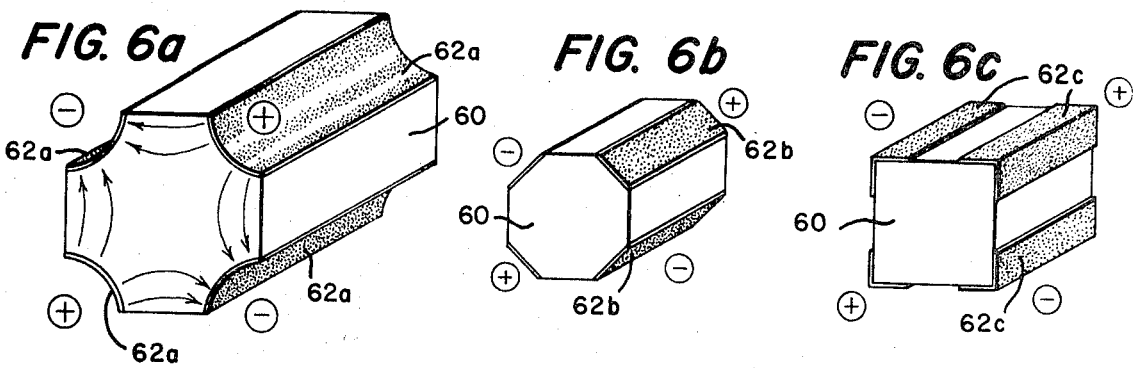
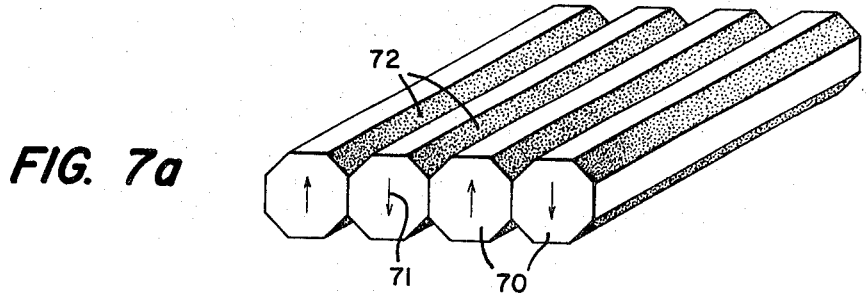
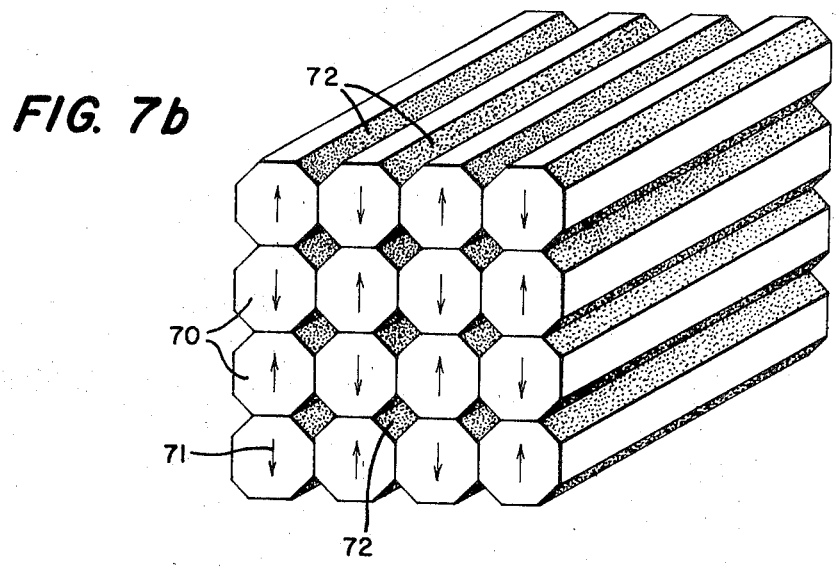
INVENTORS
TZUO-CHANG LEE
JAMES D. ZOOK
BY
Omund R. Dahle
ATTORNEY.

PARALLEL ARRAY LIGHT BEAM DEFLECTOR WITH VARIABLE PHASE PLATE

BACKGROUND OF THE INVENTION

Light beam deflectors are used for controlling the position of a light beam in an analog manner. Prior art light beam deflectors have achieved deflection by passing a light beam through a boundary formed by an electro-optic material such as KDP, KTN, or $LiNbO_3$ having different electric field dependent indices of refraction. Due to the difficulties in obtaining suitable crystal material, it is of major importance to obtain the maximum number of resolvable spots for a given amount of electro-optic crystal. In order to obtain a large number of resolvable spots, it is necessary that the light deflector be able to scan through a large total deflection angle in comparison to the Fraunhofer diffraction spreading angle of the beam.

The angle $\phi$ through which the light beam is deflected by the electro-optic crystal can be found by applying Snell's law, which shows to a first order approximation that the deflection angle $\phi=(\Delta NL)/W$,
Where
$\Delta N$ = difference in the refractive index of two adjacent regions due to an applied electric field,
$W$ = aperture width of the deflector, and
$L$ = length of the deflector.

Therefore, it can be seen that to obtain a maximum deflection angle it is desirable to increase $L$ and decrease $W$. However, the light must pass out the end of the deflector and not the side, and therefore for a given aperture $W$ there is a length $L$ which yields a maximum possible deflection angle. Deflectors having the same length to width ratio and the same maximum value of $\Delta N$ will have the same maximum deflection angle.

To obtain the number of resolvable spots $N_R$, the total deflection angle $\phi$ is divided by the Fraunhofer diffraction spread angle $\theta=\lambda/W$, where $\lambda$ is the optical wavelength in vacuum of the incident light. Therefore, for the length to width ratio which achieves maximum deflection angle $\phi$, the number of resolvable spots $N_R$ can be increased only by reducing the Fraunhofer diffraction $\theta$. This is accomplished by increasing $W$, but to maintain the same length to width ratio, $L$ must be increased by a similar proportion. For example, if it is desired to double the number of resolvable spots, both $L$ and $W$ must be doubled, and therefore four times the amount of electro-optic material must be used, assuming the same thickness of deflector in each case.

A method for increasing the number of resolvable spots for a given amount of electro-optic material was proposed by D. D. Eden in U.S. Pat. No. 3,497,285. A plurality of triangular electrodes are tiered upon opposite faces of an electro-optic crystal. Effectively, the deflector becomes a parallel array of deflectors of length $L$ and width $W$. It is suggested that if each deflector can attain a deflection angle $\phi$ and $N_R$ resolvable spots, then five deflectors in parallel can attain the same deflection angle $\phi$, but since the effective aperture with respect to Fraunhofer diffraction is $5W$, the number of resolvable spots is $5N_R$. In practice, however, since a parallel array behaves like a grating, such an increase in the number of resolvable spots is not obtained. The grating like behavior is caused by the fact that while light entering the deflectors is coplaner, the wave front of the light is broken up as it enters the individual deflectors and each piece of the wave front is deflected separately by essentially the same angle $\phi$. The wave fronts of the emerging beam are not coplanar. By this we mean that wave fronts corresponding to a particular phase do not lie in the same plane, but lie in parallel planes separated by steps. The same type of wave front is produced by an echelette grating. When focused, the emerging beams interfere so that several separate spots corresponding to the different diffraction orders instead of a singular spot are obtained. Only when the applied voltage $V_p$ is such that the induced optical path difference (IOPD) is a multiple of the light wavelength $\lambda$, are the wave fronts of the light emerging from each of the deflectors coplanar, and a resolvable spot obtained. Continuous optical scanning and an increased number of resolvable spots are not obtained by a parallel array of deflectors.

SUMMARY OF THE INVENTION

In the present invention, a parallel array of light deflectors is used in conjunction with a variable phase plate. The variable phase plate adjusts the phase of the waves so that after deflection the wave fronts of the emerging beams are coplanar thus avoiding the grating effect. The present invention greatly increases the number of resolvable spots obtainable by a single deflector making use of the same amount of electro-optic material, or a parallel array of deflectors used without a variable phase plate.

BRIEF DESCRIPTION OF THE DRAWINGS

FIGS. 2a, 2b show the deflector voltage $V_d$ and the phase plate voltage $V_p$ as functions of the induced optical path difference divided by the wavelength IOPD/$\lambda$.

FIG. 4 shows an embodiment of the present invention further including a fly's-eye lens.

FIG. 5 shows an embodiment of the present invention further including a grating stop.

FIGS. 6a, 6b and 6c show three quadrupolar deflectors which can be used as the individual deflectors in a parallel array.

FIGS. 7a and 7b show two configurations of a parallel array of quadrupolar deflectors.

DESCRIPTION OF THE PREFERRED EMBODIMENTS

Figure 1:
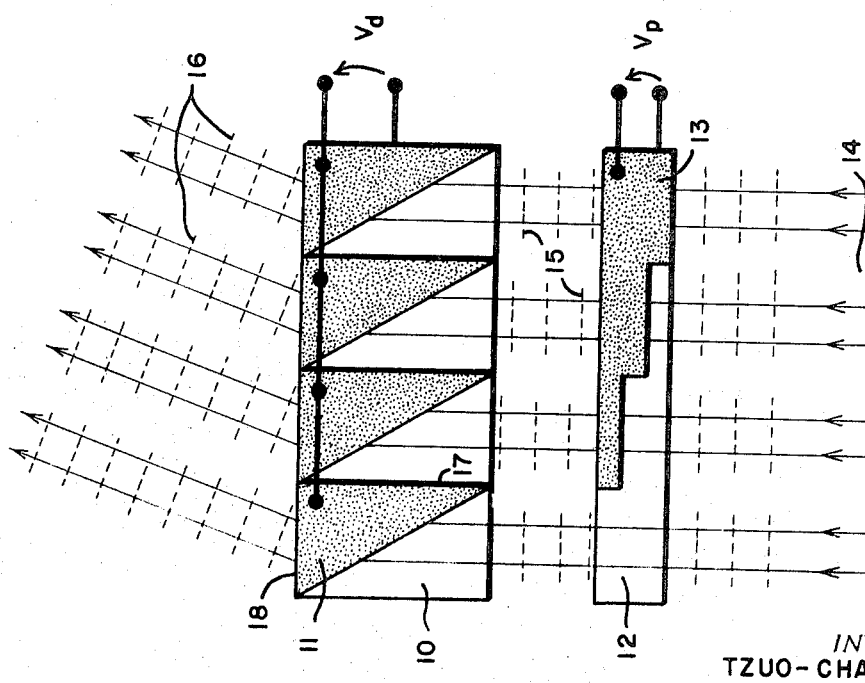
FIG. 1 shows an embodiment of the present invention utilizing a parallel array of light beam deflectors and a variable phase plate.

Referring to FIG. 1, a light beam deflection system using a parallel array of light beam deflectors 10 is shown. For illustrative purposes, four electro-optic deflectors having triangular electrodes 11 located on opposite faces of the deflectors are shown. The electrodes are shaped such that one side 17 of the triangle is parallel and another side 18 is perpendicular to the direction of propagation of the light beam. A variable phase plate 12 formed from a body of electro-optic material having shaped electrodes 13 on opposite faces of the body is located in the path of the light beam 14 prior to the parallel array of deflectors.

A voltage $V_p$ is applied to the electrodes 13 of the phase plate so as to vary the phases of the wave fronts 15 entering the individual deflectors 10 and produce wave fronts 16 that are coplanar as they emerge from the deflectors. If each deflector is capable of five resolvable spots, the induced optical path difference IOPD between the two external rays in a given deflector will be as much as five wavelengths of light. When the voltage $V_d$ applied to the deflectors 10 is such that IOPD is a multiple of the light wavelength $\lambda$, then the wave fronts of all four deflectors are coplaner, and the phase plate voltage $V_p$ is zero. At other voltages, the voltage $V_p$ applied to the phase plate is of the right magnitude to insure that the wave fronts from the parallel deflectors are coplanar. FIGS. 2a and 2b show $V_d$ and $V_p$ as functions of IOPD/$\lambda$ respectively. FIG. 2a shows the IOPD varies linearly with $V_d$. It can be seen from FIG. 2b that when IOPD/$\lambda$ is an integer, in other words when IOPD is multiple of the light wavelength $\lambda$, $V_p$ is zero. To obtain continuous scanning of the light beam, it is necessary that the wave fronts emerging from the parallel deflectors be coplanar even when IOPD/$\lambda$ is not an integer. $V_p$ is the voltage which is necessary to compensate the steps in the individual wave fronts and make them coplanar.

Figure 3:
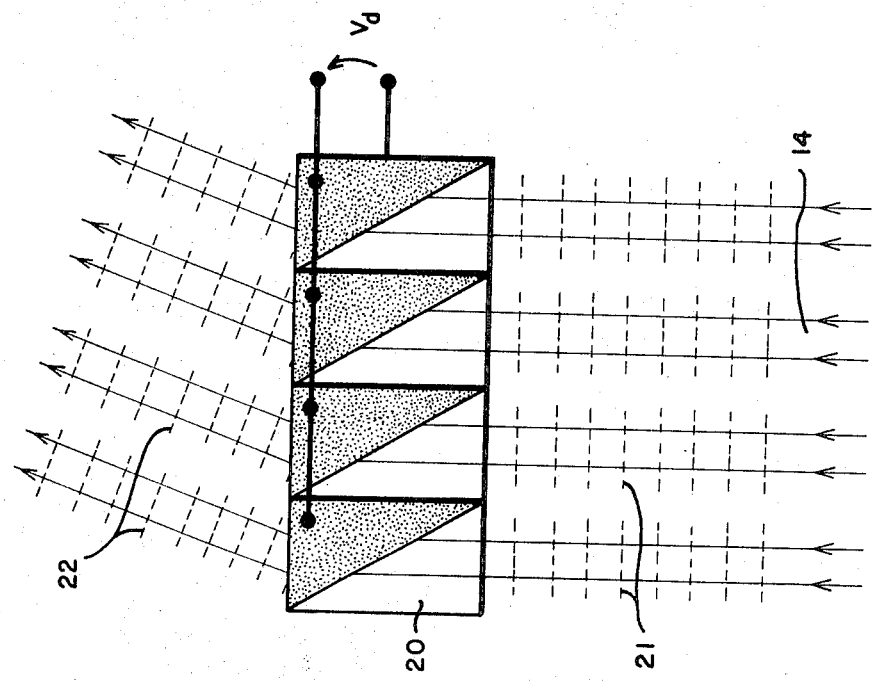
FIG. 3 shows a prior art parallel array without a variable phase plate.

FIG. 3 shows the prior art parallel array 20 in which no variable phase plate is used. While the wave fronts 21 of the light entering the parallel deflectors are coplanar, the wave fronts 22 emerging from the deflectors are generally not coplanar. Only when IOPD/$\lambda$ is an integer are the emerging wave fronts 22 coplanar.

In the embodiment shown in FIG. 1 in which a parallel array of deflectors 10 capable of five resolvable spots each is used in conjunction with a variable phase plate, the total number of resolvable spots is 4×5=20. The amount of electro-optic material used for the parallel deflectors equals four times the amount of material used for a single deflector of five spots. In order to quadruple the resolution of a single deflector the amount of electro-optic material must be increased by at least 16 times, since the length as well as the aperture must be increased. In general, if the parallel array consists of $N_1$ deflectors having a length to width ratio $L/W$, the total volume of electro-optic material is $N_1LW_d$, where $d$ is the deflector thickness.

If a single deflector having the same area $L'W'=N_1LW$ as that of the parallel array and having the same length to width ratio $L'/W'=L/W$, it can be shown that the parallel array produces $\sqrt{N_1N_2/N_1+N_2}$ times as many resolvable spots as the single deflector, where $N_2$ is the resolution of the parallel deflectors. Therefore, the gain in resolution by the parallel array for a given amount of material is $\sqrt{N_1N_2/N_1+N_2}$. Thus, if $N_1$ is much less than $N_2$, the gain in resolution is approximately $\sqrt{N_1}$ and the amount of material in the phase plate is negligible in comparison to the total amount of material required for the parallel array. The total resolution of the parallel array with phase plate is $N_1N_2$.

The parallel array with phase plate can be used as a Y-deflector of an X-Y deflector system, where X-deflection occurs before Y-deflection. In the prior art two-dimensional deflector systems, the Y-deflectors are much larger than the X-deflectors because X-deflection has taken place before the beam reaches the Y-deflectors. Therefore, the Y-deflectors are quite thick and are driven at a much higher voltage than that required for X-deflection. With the parallel array system, a larger deflector is possible which operates at lower voltages than those required by a single deflector of the same size.

In FIG. 1 the phase plate 12 is located between the light source and the parallel array 10. It is, however, possible to locate the phase plate 12 behind the parallel array 10 so long as the deflection angle of the array is not so large that a deflected beam passing through one region of the phase plate trespasses into a neighboring region of the phase plate.

With the parallel array system of the present invention, it is desirable to take precautions to insure that the light is not deflected onto the walls of the array elements. FIG. 4 shows a fly's-eye lens 40 with a lenslet 41 for each individual element of the array. The lenslet weakly focuses the light 42 entering the individual deflectors 10. By proper positioning of the lenslets, essentially all of the light is captured and sent through the array. A negative fly's-eye lens 43 is placed at the opposite end of the individual deflectors to make the emerging rays 44 parallel. Lee and Zook showed in the *IEEE Journal of Quantum Electronics*, page 445, July 1968, that the maximum $N_R$ for a focused beam is given by $$N_R = \frac{\phi_m W}{\lambda}\left(1 - \frac{\phi_m L}{4W}\right),$$

where $\phi_m$ = maximum deflection angle.
The reduction factor in the number of resolvable spots for a focused beam is represented by the quantity in brackets $$\left(1 - \frac{\phi_m L}{4W}\right).$$

This reduction is due to the fact that the focused beam passes through a smaller amount of electro-optic material than does an unfocused beam.

FIG. 5 shows an alternative method to that shown in FIG. 4. A grating stop 50 is positioned to block that portion of the light which would hit the walls. If $W_1$ represents the reduced aperture of the beam at the incident surface of the individual deflector, the number of resolvable spots is then $$N_R = (\phi_m W_1)/\lambda,$$

and since $$W_1 = W - (\phi_m L)/2$$

then $N_R$ can be given by $$N_R = \frac{\phi_m W}{\lambda}\left(1 - \frac{\phi_m L}{2W}\right).$$

It can be shown that the optimum value of $W_1$ is $4/5\ W$, and therefore the fraction of light that is passed through the deflector is 4/5 of the initial beam.

In order to utilize the parallel array system, it is necessary that the individual deflectors produce deflection angles that are essentially identical. That is, the emerging wave fronts must be coplanar when no deflection voltage is applied. Therefore, it is highly desirable that the array elements be identical, particularly in length. Making identical elements is most practical if the elements are very simple. One simple type of electro-optic deflector is the quadrupolar deflector. FIG. 6 shows three possible configurations of a quadrupolar deflector made from a single electro-optic crystal 60 which can be used as an element of a parallel array of deflectors. The electrodes 62 of the deflector run along the corners of the parellelepiped and form a quadrupolar field configuration when voltages of similar polarity are applied to opposite corners. If the electrodes 62a are shaped in the form of hyperbolas, as in FIG. 6a, the resulting field within the crystal material has linear gradients which cause a linear variation in the index of refraction transverse to the direction of propagation. A light beam is deflected in the direction of the gradient of the refraction. FIGS. 6b and 6c show two electrode configurations 62b and 62c which are more easily fabricated than that of 6a, but which achieve a sufficiently pure quadrupole field to obtain deflection. One advantage of the quadrupolar deflector is that it comprises a homogeneous body, whereas a deflector formed by two triangular prisms has an interface between the prisms through which the beam must pass. Every crystal surface through which the beam passes must be polished; therefore, the quadrupolar deflector has two surfaces, the incident and emerging surfaces, which must be polished. A prismatic deflector consisting of two or more crystals, on the other hand, requires four or more polished surfaces. In addition, the prismatic deflector requires optical contact or index matching cement to join the two crystals. The reduced number of polished surfaces and the absence of optical contact cement make the quadrupolar deflector considerably more simple to fabricate than the prismatic deflector.

Since the incident and emerging surfaces of a quadrupolar deflector are the critical surfaces which must be polished, a large number of identical elemental quadrupolar deflectors can be fabricated by polishing opposite faces of a single crystal of electro-optic material and then cutting the crystal into individual elements. The incident (and emerging) surface of each element is assured of being essentially identical to the others because they were all polished at the same time. An alternative method is to fabricate the parallel array from the elements and then polish the incident and emerging surfaces of the array.

FIG. 7 shows two embodiments of a parallel array of quadrupolar deflectors similar to those shown in FIG. 6. FIG. 7a shows a single row of quadrupolar deflectors 70. Each electrode 72 is shared by two adjacent elements. The polarity of the voltages applied to the electrodes of one elemental deflector and therefore the fields within that deflector are exactly opposite those within the adjacent deflectors. Therefore, to insure that the gradient in refractive index in each elemental deflector is in the same direction, the crystallographic orientation of each deflector, designated by an arrow 71, is oriented opposite to that of adjacent deflectors. In materials having a polar axis, the polar axis of each deflector is opposite that of adjacent deflectors. In materials not having a polar axis, such as cubic materials with a linear electro-optic effect, alternate deflectors must be oriented so that the deflection produced by each deflector is in the same direction.

FIG. 7b shows a parallel array of quadrupolar deflectors comprising several rows of deflectors 70. As in FIG. 7a, the crystallographic orientation 71 of an individual deflector is in an opposite direction to the orientation of the adjacent deflectors. This checkerboard arrangement has the advantage that each electrode 72 of the quadrupolar deflectors is shared by four elements.

Another advantage of the quadrupole array shown in FIG. 7 is the acoustic resonance properties of such a system. First, the frequencies at which the acoustic thickness resonances occur are inversely proportional to the width of the element and therefore occur at higher frequencies for a quadrupole array than for a single deflector of equivalent size due to the fact that the resonance is characterized by the dimensions of each elemental deflector rather than dimensions of the entire array. Second, since the like polarity electrodes are located at diagonal opposite corners of the element, the opposite sides of the element experience opposite strains, and therefore the fundamental thickness mode cannot occur. it has been shown that the first vibrational mode is higher in frequency than the fundamental thickness mode, depending on the width to thickness ratio of the parallelepiped. Third, if the array elements are bonded together the flexure modes are effectively clamped.

While this invention has been disclosed with particular reference to preferred embodiments, it is to be understood that changes in form and detail by those skilled in the art may be made without departing from the spirit and the scope of the invention. For example, although electro-optic deflectors have been specifically discussed as the individual elements of the parallel array, it is obvious that acousto-optic or a mechanical deflectors can also be used. Also, the variable phase plate shown is but one possible embodiment of means for individually controlling the phase of portions of a light beam.

The embodiments of the invention in which an exclusive property or right is claimed are defined as follows:

1. A light beam deflection system comprising:
   a parallel array of light beam deflectors,
   means for controlling the deflector array to produce essentially the same deflection angle for each deflector, and
   means for individually controlling the phase of portions of the beam so that the wave fronts of the light emerging from the deflection system are coplanar.

2. The deflection system of claim 1 wherein the beam passes through the means for individually controlling the phase of portions of the beam before entering the parallel array of light beam deflectors.

3. The deflection system of claim 1 wherein the means for individually controlling the phase of portions of the light beam comprises a single body of electro-optic material having a pair of shaped electrodes.

4. The deflection system of claim 1 wherein the light beam deflectors comprise bodies of material having an electric field controllable index of refraction.

5. The deflection system of claim 4 wherein the means for controlling the deflector array comprises means for simultaneously varying the index of refraction of each of the deflectors.

6. The deflection system of claim 5 wherein the means for simultaneously varying the index of refraction of each of the deflectors comprises electrodes positioned in a manner to produce an essentially linear variation in the refractive index of the material in a direction transverse to the direction of propagation of the beam.

7. The deflection system of claim 6 wherein the electrodes comprise first, second, third and fourth electrodes extending along the crystal in the direction of propagation of the beam.

8. The deflection system of claim 7 wherein the electrodes of a deflector are in electrical contact with electrodes of adjacent deflectors, and the crystallographic orientation of each deflector is in an opposite direction to those deflectors with which it is adjacent.

9. The deflection system of claim 1 wherein the system further includes individual converging lens adjacent to the incident surface of each of the deflectors so as to intercept a portion of the beam and focus the portion within the deflector.

10. The deflection system of claim 9 wherein the system further includes individual diverging lens adjacent to the emerging surface of each of the deflectors.

11. The deflection system of claim 1 wherein the system further includes means for blocking that portion of the light entering the deflectors near the boundaries of the deflectors.

12. The deflection system of claim 1 wherein the light beam deflectors are identical.

* * * * *